United States Patent
Zieba et al.

(10) Patent No.: US 12,174,342 B2
(45) Date of Patent: Dec. 24, 2024

(54) OPTICAL DEVICE HAVING OPTICAL AND MECHANICAL PROPERTIES

(71) Applicant: VIAVI SOLUTIONS INC., Scottsdale, AZ (US)

(72) Inventors: Jaroslaw Zieba, Santa Rosa, CA (US); Markus Bilger, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 17/828,978

(22) Filed: May 31, 2022

(65) Prior Publication Data

US 2022/0291423 A1    Sep. 15, 2022

Related U.S. Application Data

(63) Continuation of application No. 16/261,189, filed on Jan. 29, 2019, now Pat. No. 11,360,242.

(60) Provisional application No. 62/624,009, filed on Jan. 30, 2018.

(51) Int. Cl.
| | |
|---|---|
| G02B 1/11 | (2015.01) |
| G02B 1/08 | (2006.01) |
| G02B 1/115 | (2015.01) |
| G02B 1/14 | (2015.01) |
| G02B 1/16 | (2015.01) |
| G02B 5/20 | (2006.01) |
| G02B 5/28 | (2006.01) |
| G01S 7/481 | (2006.01) |
| G02B 1/18 | (2015.01) |
| G02B 5/08 | (2006.01) |

(52) U.S. Cl.
CPC ................. *G02B 1/14* (2015.01); *G02B 1/08* (2013.01); *G02B 1/11* (2013.01); *G02B 1/115* (2013.01); *G02B 1/16* (2015.01); *G02B 5/20* (2013.01); *G02B 5/285* (2013.01); *G01S 7/481* (2013.01); *G02B 1/18* (2015.01); *G02B 5/0825* (2013.01)

(58) Field of Classification Search
CPC ... G02B 1/08; G02B 1/11; G02B 1/14; G02B 1/16; G02B 1/18; G02B 1/115; G02B 5/0825; G02B 5/208; G02B 5/285; G02B 5/20; G02B 5/1809; G02B 5/3066; G01S 7/481; G01S 7/4813; C23C 14/3464; C23C 14/0635; C23C 14/3457; G01N 21/17; G01N 2021/3568
See application file for complete search history.

(56) References Cited

U.S. PATENT DOCUMENTS

| | | | |
|---|---|---|---|
| 4,747,674 A | | 5/1988 | Butterfield et al. |
| 11,041,718 B2 * | | 6/2021 | Send ................. G01B 11/026 |
| 2003/0012936 A1 | | 1/2003 | Draheim et al. |
| 2003/0116270 A1 | | 6/2003 | Hawa et al. |
| 2006/0204766 A1 | | 9/2006 | Zieba et al. |

(Continued)

FOREIGN PATENT DOCUMENTS

| | | | |
|---|---|---|---|
| CN | 1659453 A | | 8/2005 |
| CN | 1742215 A | | 3/2006 |

(Continued)

*Primary Examiner* — Mustak Choudhury
(74) *Attorney, Agent, or Firm* — Mannava & Kang, P.C.

(57) ABSTRACT

An optical device includes a substrate and a coating applied to the substrate, wherein the optical device has a first side exposed to an environment and a second side that is unexposed.

18 Claims, 3 Drawing Sheets

10

(56) References Cited

U.S. PATENT DOCUMENTS

| | | | |
|---|---|---|---|
| 2008/0252985 A1* | 10/2008 | Zhu | G06K 7/10782 |
| | | | 359/641 |
| 2009/0104438 A1 | 4/2009 | Lalli et al. | |
| 2009/0188726 A1 | 7/2009 | Chang et al. | |
| 2010/0253600 A1* | 10/2010 | Seder | G02B 1/14 |
| | | | 345/7 |
| 2012/0127578 A1 | 5/2012 | Bright et al. | |
| 2012/0250314 A1 | 10/2012 | Maikowski et al. | |
| 2013/0141693 A1 | 6/2013 | McCabe et al. | |
| 2014/0014824 A1 | 1/2014 | Huang et al. | |
| 2014/0014838 A1* | 1/2014 | Hendrix | C23C 14/548 |
| | | | 359/359 |
| 2014/0090864 A1 | 4/2014 | Paulson | |
| 2015/0276987 A1 | 10/2015 | McKenzie et al. | |
| 2016/0152002 A1 | 6/2016 | Inui et al. | |
| 2016/0319421 A1 | 11/2016 | Mildebrath et al. | |
| 2016/0377889 A1 | 12/2016 | Lazar | |
| 2019/0127845 A1* | 5/2019 | Shuto | C23C 14/10 |

FOREIGN PATENT DOCUMENTS

| | | |
|---|---|---|
| CN | 101276005 A | 10/2008 |
| CN | 1685252 B | 9/2011 |
| CN | 104040412 A | 9/2014 |
| CN | 105324240 A | 2/2016 |
| CN | 106164753 A | 11/2016 |
| EP | 2624020 A1 | 8/2013 |
| EP | 2831708 A1 | 2/2015 |
| EP | 3187909 A1 | 7/2017 |
| EP | 3206060 A1 | 8/2017 |
| EP | 3407100 A1 | 11/2018 |
| JP | H0738788 A | 2/1995 |
| JP | H09230031 A | 9/1997 |
| JP | 2002071940 A | 3/2002 |
| JP | 2002254573 A | 9/2002 |
| JP | 2003004942 A | 1/2003 |
| JP | 2003521679 A | 7/2003 |
| JP | 2004198617 A | 7/2004 |
| JP | 2006194639 A | 7/2006 |
| JP | 2006255694 A | 9/2006 |
| JP | 2008268277 A | 11/2008 |
| JP | 2009054902 A | 3/2009 |
| JP | 2014145955 A | 8/2014 |
| JP | 2015040945 A | 3/2015 |
| JP | 2015506459 A | 3/2015 |
| JP | 2016224113 A | 12/2016 |
| JP | 2017175515 A | 9/2017 |
| KR | 101611208 B1 | 4/2016 |
| TW | 446637 B | 7/2001 |
| WO | 2013087799 A1 | 6/2013 |
| WO | 2013151984 A2 | 10/2013 |
| WO | 2013169987 A1 | 11/2013 |
| WO | 2016129699 A1 | 8/2016 |
| WO | 2017145910 A1 | 8/2017 |
| WO | 2017183145 A1 | 10/2017 |
| WO | 2017218433 A1 | 12/2017 |
| WO | 2018052057 A1 | 3/2018 |

* cited by examiner

OPTICAL DEVICE HAVING OPTICAL AND MECHANICAL PROPERTIES

RELATED APPLICATIONS

This application is a continuation under 35 U.S.C. § 120 of co-pending U.S. patent application Ser. No. 16/261,189, filed Jan. 29, 2019, which claims priority to U.S. Provisional Application No. 62/624,009, filed Jan. 30, 2018, the disclosure of which are hereby incorporated by reference in their entireties.

FIELD OF THE INVENTION

The present disclosure generally relates to an optical device including a substrate and a coating applied to the substrate, wherein the optical device has a first side exposed to an environment and a second side that is unexposed

BACKGROUND OF THE INVENTION

Optical devices for optical sensors are becoming increasingly important with the advent of semi-autonomous, autonomous, and remotely controlled vehicles. For example, there is an increase interest in the application of LIDAR (Light detection and ranging) technology in vehicles. However, the use of optical devices for optical sensors raises a concern as to whether the sensors can withstand mechanical, optical, and environmental factors that could damage or adversely impact the function of the sensors. As an example, the sensors would be subjected to environmental factors, such as rain and wind, that could damage, scratch, or otherwise effect the durability and operability of the sensor.

SUMMARY OF THE INVENTION

In an aspect, there is disclosed a substrate; and a coating applied to the substrate, wherein the optical device has a first side exposed to an environment and a second side that is unexposed.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

It is to be understood that both the foregoing general description and the following detailed description are exemplary and explanatory only, and are intended to provide an explanation of various embodiments of the present teachings. The layers/components shown in each Figure may be described with regard to a particular Figure, but it is understood that the description of a particular layer/component would be applicable to the equivalent layer/component in the other Figures.

Figure 1:
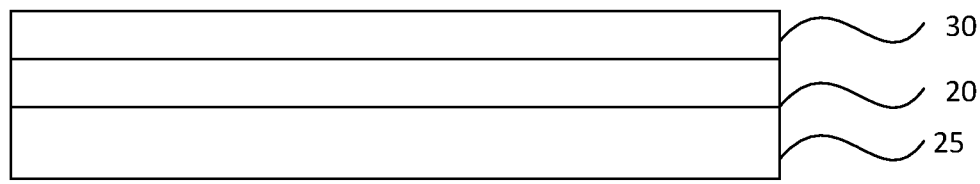
FIG. 1 is a cross-section of an optical device according to an aspect of the invention.

In its broad and varied embodiments, there is disclosed an optical device 10 including a substrate 20; and at least one coating 30 applied to the substrate 20; in which the optical device 10 has a first side exposed to an environment and a second side that is unexposed, as shown in FIG. 1. An "exposed" first side means facing the environment, such as light, air, dirt, wind, etc. An "unexposed" second side means not facing the environment and can include being applied to another device 25, such as a window, a sensor (e.g. LIDAR sensor), or a lens, for example, a self-standing optical lens, or a lens as part of a complex optical system.

The disclosed optical device 10 can include at least one coating 30 that can protect another device, as disclosed above, against mechanical, optical, chemical and environmental factors. The at least one coating 30 can provide at least one function. The at least one coating 30 can include one or more coatings in order to provide multiple functions to the optical device 10. Additionally, the at least one coating 30 can include one or more coatings 30 on an exposed first side and/or on an unexposed second side of the substrate 20 in order to optimize the functions of each coating 30 of the optical device 10.

The substrate 20 of the optical device 10 can be any material capable of being coated. Non-limiting examples of substrates 20 include plastics, synthetic sapphire, glass, synthetic diamond, optical ceramic materials, optical quality polymers, and light transmitting substrates with absorption spectra as required by the functional application of the optical device 10, such as silicon. Optical quality polymers include polycarbonates, arcylates, and cyclic olefin polymers. Various types of glass can be used including chemically strengthened glass.

Figure 6:
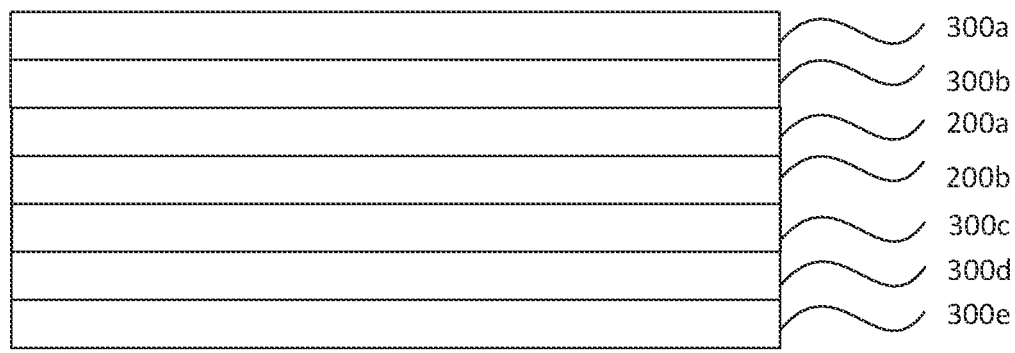
FIG. 6 is a cross-section of an optical device according to another aspect of the invention.

In an aspect, as shown in FIG. 6, the optical device 100 can include more than one substrate 200a, 200b. The inclusion of more than one substrate 200a, 200b can improve the safety of the optical device 100 and the sensor it is applied thereon. Additionally, the inclusion of more than one substrate 200a, 200b in the optical device 100 can increase the structural strength and/or flexibility of the optical device 100. The optical device 100 can include two or more substrates 200a. 200b. The two or more substrates 200a, 200b can be a laminate with two or more substrates 200a, 200b fixed together. In an aspect, an adhesive can be included between the two more substrates 200a, 200b to form the laminate. A laminate substrate can provide a thinner and stronger optical device 100. However, the thickness of a single substrate or a laminate substrate is not a limiting factor in selecting a substrate suitable for the optical device 100.

The at least one substrate 200a, 200b can be the same or different. In an aspect, a first substrate 200a can be manufactured from hard optical materials ranging, depending on application and location, from chemically strengthened glass to inherently, extremely hard and impact resistant materials, such as synthetic sapphire or diamond. The first substrate 200a can include coatings 300a, 300b, 300c, 300d, 300e providing mechanical and protective functions on the first exposed side and can include a second substrate and/or coatings 300a, 300b, 300c, 300d, 300e providing optical functions on the second unexposed side. A second substrate 200b can function as a carrier of optical coatings that can provide additional protective functions to the optical device 10.

The substrate(s) 20, 200a, 200b for use in the optical device 10, 100 can be selected based upon safety, cost, weight, etc. The selection of the substrate 20, 200a, 200b is a variable in the formation of the optical device 10, 100. In particular, the selection of the substrate(s) 20, 200a, 200b can change the order of layers of coatings 30, 300a, 300b, 300c, 300d, 300e in the optical device 10, 100.

FIGS. 2-5 illustrate various optical devices 10 contemplated herein. These are exemplary in nature. It should be appreciated that the order of the coatings on the first exposed side and the second unexposed side can vary. Additionally, the types of coatings present on the first exposed side and the second unexposed side can vary. Generally, the coatings 30 that can provide a mechanical or protective function are present on the first exposed side of the optical device and the coatings that can provide an optical function are present on the second exposed side of the optical device. The coatings 30 of FIGS. 2-5 are described more fully below.

Figure 2:
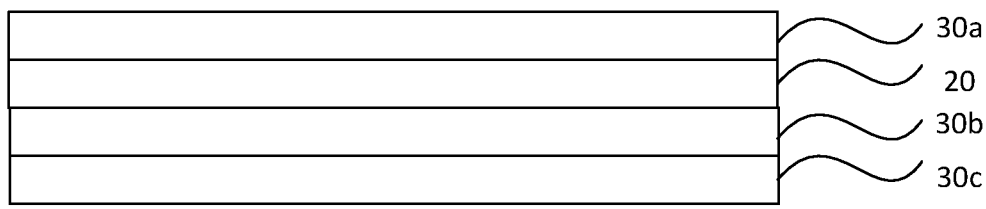
FIG. 2 is a cross-section of an optical device according to another aspect of the invention.

As shown in FIG. 2, there is illustrated an optical device 10 including on a first exposed side an antireflective coating with anti-smudge treatment 30a, a substrate 20, and on a second unexposed side an electrical conducting coating 30b, and a glare reducing coating 30c.

Figure 3:
FIG. 3 is a cross-section of an optical device according to another aspect of the invention.

As shown in FIG. 3, there is illustrated an optical device 10 including on a first exposed side an antireflective coating with anti-smudge treatment 30a, a substrate 20, and on a second unexposed side an electrical conducting coating 30b, a glare reducing coating 30c, and an antireflective coating 30e.

Figure 4:
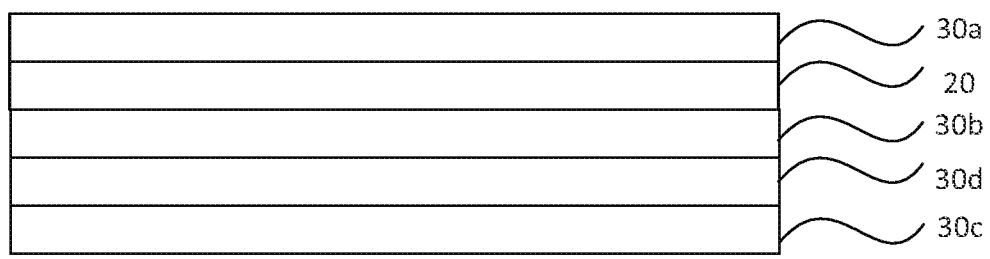
FIG. 4 is a cross-section of an optical device according to another aspect of the invention.

As shown in FIG. 4, there is illustrated an optical device 10 including on a first exposed side an antireflective coating with anti-smudge treatment 30a, a substrate 20, and on a second unexposed side an electrical conducting coating 30b, a bandpass filter 30d, and a glare reducing coating 30c.

Figure 5:
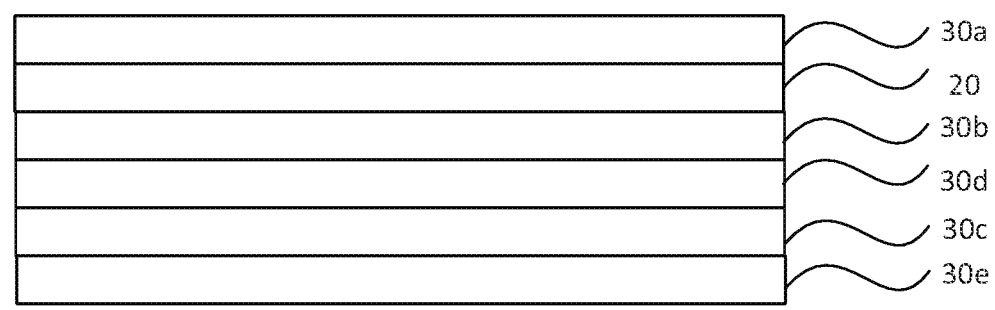
FIG. 5 is a cross-section of an optical device according to another aspect of the invention.

As shown in FIG. 5, there is illustrated an optical device 10 including on a first exposed side an antireflective coating with anti-smudge treatment 30a, a substrate 20, and on a second unexposed side an electrical conducting coating 30b, a bandpass filter 30d, a glare reducing coating 30c, and an antireflective coating 30e.

The optical device 10 can include a coating 30 applied to the substrate 20, such as an antireflective coating 30e. In an aspect, the antireflective coating 30e can be present on the first side of the optical device 10. The antireflective coating 30 can also be treated to confer an anti-smudge 30a property, as shown in FIGS. 2-5. In another aspect, the antireflective coating 30e can be present on the second side of the optical device 10, as shown in FIGS. 3 and 6. The optical device 10 can include an antireflective coating with an anti-smudge treatment 30a on a first side and an antireflective coating 30e (without an anti-smudge treatment) on the second side.

An antireflective coating 30e can be a dielectric stack and can reduce the light reflection on an interface with the substrate 20. Suitable dielectrics for forming the dielectric stack include metal oxides such as $TiO_2$, $Ta_2O_5$, $ZrO_2$, and $SiO_2$, which are optically isotropic and ca exhibit high transparency in the visible wavelength spectrum range (e.g., from 400 nm to 700 nm). The antireflective coating 30e can be a stack including a first plurality of dielectric layers having a first refractive index, such as a low refractive index, for example, $SiO_2$ or magnesium fluoride ($MgF_2$), interleaved with at least a second plurality of dielectric layers having a second refractive index, such as a high refractive index. Non-limiting examples of high refractive index materials include niobium oxide, tantalum oxide, aluminum oxide, titanium oxide, zirconium oxide, and their combinations.

The antireflective coating 30e can be formed of a stack of layers of $NbTiO_x$, $SiO_2$, or the like. In an aspect, the antireflective coating 30e can be a thin film dielectric stack of a first layer of $NbTiO_x$ of about 50 nm, a first layer of $SiO_2$ of about 18 nm, a second layer of $NbTiO_x$ of about 16 nm, a second layer of $SiO_2$ of about 101 nm.

The optical device 10 can include a coating 30 applied to the substrate, such as a protectant coating. The protectant coating can be present on the first side of the optical device. The optical device 10 can include the protectant coating alone or in combination with the antireflective coating 30e. In an aspect, the protectant coating is applied to an antireflective coating 30e, which is applied to the substrate 20. The protectant coating and the antireflective coating 30e are both on the first side of the optical device 10.

In an aspect, the protectant coating can include a fluorinated alkyl ether polymer having a functionalized silane. An example of such a compound has the general formula: $R_m$—Si—$X_n$ (1), where R includes the fluorinated alkyl ether repeat unit, X can be an alkoxy group, a chloride, or an amine group, in which m+n equals 4. For example, poly(perfluoropropyl ether) functionalized with a trimethoxy silane group and poly(perfluoroethyl ether) functionalized with a silazane group, are two such compounds.

A protectant coating can be durable and can include a compound having the simplified formula: $CF_3$—[CH($CF_3$)—$CH_2$—O—]$_x$—$CONCH_3$—$(CH_2)_3$—Si—$(OC_2H_5)_3$ (2) where x is an integer from 7-11. This compound can also include a divalent linking group (i.e., —$CONCH_3$—$(CH_2)_3$—). Of course, compounds similar in structure and function to that shown in formula (2) can also be used in the protectant coating. In particular, both N-methyl-N-(-triethoxypropyl)-2-[α-heptafluoropropoxy {Poly(oxy(trifluoromethyl)-1,2-ethanediyl)}tetrafluoropropionamide, commercially available compounds, can be used in the protectant coating.

Methods of applying the protectant coating can include wet techniques such as dipping, flowing, wiping, and/or spraying the surface with a liquid, solution, or gel-like carrier containing the coating compound, and dry techniques such as vapor coating the coating compound onto a surface (either at ambient pressure or under vacuum).

The optical device 10 can include a coating 30 applied to the substrate 20, such as an electrical conducting coating 30b, as shown in FIGS. 2-5. The electrical conducting coating 30b can be present on the second side of the optical device 10. The electrical conducting coating 30b can be a low surface energy treatment that serves as a soil, water, and dust repelling surface. This coating 30b can have a low coefficient of friction, such as less than 0.08. In this manner, the electrical conducting coating 30b can reduce the susceptibility of the optical device 10 to being damaged by an abrasive media.

The electrical conducting coating 30b can include indium tin oxide (ITO), nano-particles based transparent composites, and other commonly used optically transparent conductors. In an aspect, the electrical conducting coating 30b can be transparent at a wavelength of operation of a LIDAR sensor, such as between about 850 nm to about 2000 nm.

The electrical conducting coating 30b can act as a heating element to increase a temperature of the optical device 10, such as from about 30° C. to 80° C. As a heating element, an optical device 10 including this coating 30b can be used to eliminate and/or reduce at least one of: the risk of fogging of a window with an attached sensor, risk of moisture condensation, and increase soil repellency of the first exposed side of the optical device 10.

Additionally, this electrical conducting coating 30b can increase the hydrophobicity and oleophobicity of an outer antireflective coating 30 on a first side of the substrate by increasing the efficiency in repelling water and contaminants.

The electrical conducting coating 30b may not be mechanically durable enough to create a robust surface. For this reason, the electrically conducting coating 30b should be applied to the second side, i.e. the side of the optical device facing the sensor.

The optical device 10 can include a coating 30 applied to the substrate 20, such as a glare reducing coating 30c. The glare reducing coating 30c can be present on the second unexposed side of the optical device 10, as shown in FIGS. 2-5. The glare reducing coating 30c and an electrical conducting coating 30b can both be present on the second unexposed side of the optical device 10. In an aspect, the glare reducing coating 30c can be applied to an electrical conducting coating 30b, which is applied to the substrate 20.

An example of a glare reducing coating 30c can be a multi-layer structure of a circular polarizer including a linear polarizer combined with a quarter wave optical retarder. Wave retarders are birefringent materials that alter (retard) the polarization state or phase of light traveling through them. A wave retarder has a fast (extraordinary) and slow (ordinary) axis. As polarized light passes through a wave retarder, the light passing through the fast axis travels more quickly through the wave retarder than through the slow axis. In the case of a quarter wave retarder, the wave plate retards the velocity of one of the polarization components (x or y) one quarter of a wave out of phase from the other polarization component. Polarized light passing through a quarter wave retarder thus becomes circularly polarized. The glare reducing coating 30c can reduce and/or eliminate glare at the wavelength of operation of the sensor protected by the optical device 10. The glare reducing coating 30c can also allow for analysis of the polarization state of a signal beam.

The optical device 10 can include a coating 30 applied to the substrate 20, such as a bandpass filter 30d. The bandpass filter 30d can be present on the second unexposed side of the optical device 10, as shown in FIGS. 4-5. The bandpass filter 30d can be applied to the glare reducing coating 30c, which can be applied to an electrical conducting coating 30b, which is applied to the substrate 20. In an aspect, the bandpass filter 30d, glare reducing coating 30c, and the electrical conducting coating 30b can all be present on the second unexposed side of the optical device 10. In an aspect, the glare reducing coating 30c can be applied to an electrical conducting coating 30b, which is applied to the substrate 20.

The bandpass filter 30d can be realized by a full stack of dielectric low and high refractive materials. Each layer can be deposited as a quarter-wave (QW) thickness at the wavelength of the desired filter. Each partial-reflector, which may be comprised of only a single layer, is called a quarter-wave stack (QWS). The bandwidth of the filter is a function of the reflectance of quarter-wave stacks in the structure. The center wavelength of the pass-band is determined by the thickness of the spacer dielectric material. The dielectric materials used for the quarter and/or half-wave layers have indices of refraction in the range 1.3 to beyond 4.0. For example, some suitable materials are: Magnesium Fluoride (1.38), Thorium Fluoride (1.47), Cryolite (1.35), Silicon Dioxide (1.46), Aluminum Oxide (1.63), Hafnium Oxide (1.85), Tantalum Pentoxide (2.05), Niobium Oxide (2.19), Zinc Sulphide (2.27), Titanium Oxide (2.37), Silicon (3.5), Germanium (4.0), and Lead Telluride (5.0). Other dielectric materials would serve as well. Besides that, the fully dielectric band pass filter 30d can also combine anti-reflective properties.

In an aspect, the bandpass filter 30d can be a polymeric coating containing an appropriate mixture of dyes to create required absorbance or a combination of dielectric and polymeric structures.

The bandpass filter 30d can allow a wavelength of light at which a sensor operates pass and can eliminate all other wavelengths. For example, the bandpass filter 30d can block wavelengths in the visible and near IR spectral range, such as from about 400 to about 850 nm, and can transmit wavelengths above 850 nm. In this manner, the bandpass filter 30d can reduce and/or eliminate unwanted radiation from reaching a sensor attached to the optical device 10.

The optical device 10 can be attached to another device to form an optical system. The other device can be a window, a sensor (e.g. LIDAR sensor), or a lens, for example, a self-standing optical lens, or a lens. The optical device 10 can be attached to the other device using conventional deposition processes.

A method of making an optical device 10 is also disclosed. The optical device 10 can be formed using semiconductor processes.

A method of making an optical system is also disclosed. The optical device 10 can be attached to another device by conventional deposition processes to form the optical system.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or article of manufacture and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. An optical device applied to a LIDAR ("Light detection and ranging") sensor, the optical device comprising:
   a substrate having a first side positioned toward an environment and a second side positioned toward the LIDAR sensor;
   a first coating applied to the first side of the substrate, the first coating being an antireflective coating or a protectant coating;
   an electrical conducting coating present on the second side of the substrate, the electrical conducting coating being a heating element configured to increase the temperature of the optical device; and
   a bandpass filter on the second side of the optical device;
   wherein the optical device has a first side exposed to the environment and a second side that faces the LIDAR sensor.

2. The optical device of claim 1, wherein the substrate includes plastics, synthetic sapphire, glass and synthetic diamond.

3. The optical device of claim 1, wherein the optical device includes two or more substrates.

4. The optical device of claim 3, wherein the two or more substrates are laminates.

5. The optical device of claim 1, wherein the first coating is the antireflective coating.

6. The optical device of claim 1, wherein the first coating is the protectant coating.

7. The optical device of claim 6, further comprising an antireflective coating on the substrate, wherein the protectant coating is applied to the antireflective coating on the substrate.

8. The optical device of claim 7, wherein the protectant coating and the antireflective coating on the substrate are both on the first side of the optical device.

9. The optical device of claim 7, wherein the protectant coating is present on the first side of the optical device.

10. The optical device of claim 1, further comprising a glare reducing coating.

11. The optical device of claim 10, wherein the glare reducing coating is applied to the second side of the optical device.

12. The optical device of claim 11, wherein the glare reducing coating and the electrical conducting coating are both on the second side of the optical device.

13. The optical device of claim 10, wherein the bandpass filter is applied to the glare reducing coating, which is applied to the electrical conducting coating, which is applied to the substrate.

14. The optical device of claim 13, wherein the bandpass filter, the glare reducing coating, and the electrical conducting coating are all on the second side of the optical device.

15. The optical device of claim 1, wherein the glare reducing coating is a multilayer circular polarizer including a linear polarizer combined with a quarter wave optical retarder.

16. An optical device applied to a LIDAR ("Light detection and ranging") sensor, the optical device comprising:
    a substrate having a first side positioned toward an environment and a second side positioned toward the LIDAR sensor;
    a first coating applied to the first side of the substrate, the first coating being an antireflective coating or a protectant coating;
    an electrical conducting coating present on the second side of the substrate, the electrical conducting coating being a heating element configured to increase the temperature of the optical device and being transparent at a wavelength of operation of between 850 nm to 2000 nm; and
    a glare reducing coating on the second side of the substrate, the electrical conducting coating being between the glare reducing coating and the substrate;
    wherein the optical device has a first side exposed to the environment and a second side that faces the LIDAR sensor.

17. The optical device of claim 16, wherein a bandpass filter is present on the second side of the optical device, the bandpass filter capable of blocking wavelengths from 400 to 850 nm.

18. The optical device of claim 17, wherein the bandpass filter is between the glare reducing coating and the electrical conducting coating.

* * * * *